United States Patent [19]
Watanabe

[11] 3,864,242
[45] Feb. 4, 1975

[54] TREATING MUDDY-LIKE WASTE OILY MATERIAL

[75] Inventor: Shichie Watanabe, Fukuoka, Japan

[73] Assignee: Kabushiki Kaisha Imamura Seisakusho, Wakamatsu-Ku, Kitakyushu, Japan

[22] Filed: Dec. 13, 1973

[21] Appl. No.: 426,725

[52] U.S. Cl.................. 208/180, 208/184, 208/182
[51] Int. Cl......................................... C10g 27/100
[58] Field of Search .......... 208/180, 184, 179, 182; 203/45, 43, 49, 95

[56] References Cited
UNITED STATES PATENTS

| | | | |
|---|---|---|---|
| 1,202,969 | 1/1916 | Cornell | 208/185 |
| 1,823,185 | 9/1931 | Belden | 208/185 |
| 1,868,394 | 7/1932 | Miller | 203/49 |
| 2,096,220 | 10/1937 | Wilbur | 208/182 |
| 2,655,468 | 10/1953 | Greene | 203/45 |
| 3,773,658 | 11/1973 | Vu et al. | 208/180 |

*Primary Examiner*—Delbert E. Gantz
*Assistant Examiner*—Juanita M. Nelson
*Attorney, Agent, or Firm*—Oldham & Oldham Co.

[57] ABSTRACT

This invention relates to a process for cheaply treating a muddy-like waste oil material of an industrial waste material especially containing sulfur compounds at a temperature of less than the decomposition temperature of sulfur compounds without generating any secondary pollution. The process of this invention possesses the characteristic features comprising a step of adding to the muddy-like waste oil material, a paraffin base saturated hydrocarbon having a boiling point of 30°–250°C to make it easy to separate an asphalt base sludge and a low-sulfur containing fuel oil from the said waste oily material and a step of dry-distillating the said asphalt base sludge using the particular dry-distillating still to produce a coke-like sludge.

5 Claims, 1 Drawing Figure

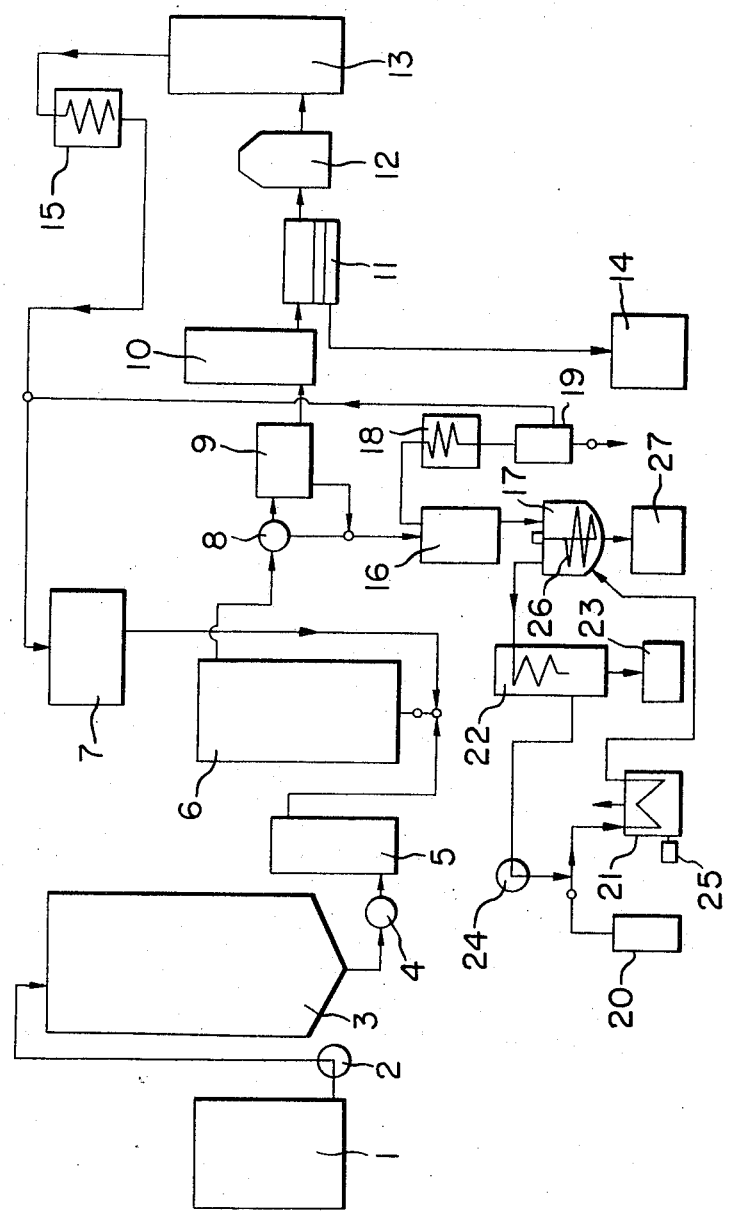

TREATING MUDDY-LIKE WASTE OILY MATERIAL

BACKGROUND OF THE INVENTION

It has not been found in the prior art, a process for cheaply treating the muddy-like waste oily material of the industrial waste material such as an engine waste oil, a factory waste oil and a shipping waste oil which will be increasingly produced in a future and will become one of public nuisance origins.

This invention relates to providing the process for cheaply treating the muddy-like waste oily material or a public nuisance waste material containing the said muddy-like waste oil to obtain the low-sulfur containing fuel oil as well as the asphalt base sludge suitable to an use of each applications thereof and also aims to reducing an amount of the industrial waste material as small as possible.

The definition of the said muddy like waste oily material in the specification means the industrial waste oily material containing a solid material, water and chemical agents etc., for example the engine waste oil, the shipping waste oil and the factory waste oil.

SUMMARY OF THE INVENTION

This invention relates to the process for treating the muddy-like waste oily material without using any combustion process comprising the first step of settling and separating the muddy oil layer and the layer containing water and the solid material in a settling tank while maintaining the temperature of the said tank to 50°–70°C, the second step of conditioning a PH value of the said muddy-like oily material to 2–4, the third step of solvent-extracting the low-sulfur containing fuel oil from the said muddy-like oily material coming from the second step with the paraffin base saturated hydrocarbon having the boiling point of 30°–250°C in an extracting tower while maintaining at a temperature of 5°–25°C and a fourth step of centrifuging the said muddy-like oily material coming from the third step to separate the low-sulfur containing fuel oil fraction containing the said paraffin base saturated hydrocarbon and the asphalt base sludge which is discarded as the coke-like sludge not containing any oily materials after dry-distillating the said asphalt base sludge at a temperature of 500° – 600°C in a sludge dry-distillating still and further a fifth step of fractionally distillating the said paraffin base saturated hydrocarbon from the said low-sulfur containing fuel oil fraction to produce the said low-sulfur containing fuel oil.

BRIEF DESCRIPTION OF THE DRAWINGS

The attached figure shows a flow sheet of the process of this invention.

DESCRIPTION OF THE PREFERRED EMBODIMENT

In the process of this invention, the muddy-like waste oily material is heated at a relative low temperature of 50° – 90°C in the settling tank to lower the viscosity of the said oily material and separate it from the solid material in the bottom of the settling tank in the first step and to send and treat the said muddy-like waste oily material to the first intermediate tank of the second step after separating and removing the said solid material. In the second step, the PH value of the muddy-like waste oily material coming from the first step is conditioned to 2–4, thereby breaking an emulsion formed between the said oily material and various kinds of such contaminating substances as chemical agents to make it easy to carry out the extracting step in the third step. The reasons why a range of the PH value is regulated to 2–4, are considered as follows: The said emulsion does not fully break in the PH value of less than 2, while in the PH value of more than 4, the efficiency of breaking the emulsion is not improved but damages the apparatus used. In the third step, the paraffin base saturated hydrocarbon having the boiling point of 30°–250°C, is added to the muddy-like waste oily material coming from the second step and maintained at a temperature of 5°–25°C to make it easy to separate the asphalt base sludge from the said muddy like waste oily material.

The reasons why the temperature in the third step is determined to a range of between 5° and 25°C are shown as follows: The said separation is not completely effected at a temperature of less than 5°C, while the asphalt base sludge may mix into the layer of the low-sulfur containing fuel oil at a temperature of more than 250°C.

In the fourth step, the asphalt base sludge is separated from the muddy-like waste oily material adding the paraffin base saturated hydrocarbon by means of a centrifugal separator. The said asphalt base sludge is discarded as the coke-like sludge not containing any oily material after dry-distillating the said asphalt base sludge at a temperature of 500° – 600°C in a sludge distillating still.

In the fifth step, the muddy-like waste oily material coming from the fourth step is fractionally distillated to obtain the paraffin base saturated hydrocarbon as a top fraction and the low-sulfur containing fuel oil as a bottom fraction.

The low-sulfur-containing fuel oil is used as the fuel oil having the good quality and the lubricant oil.

The coke-like sludge is used as a paving material and a filler. A mode of the invention is shown as follows:

The starting material of the muddy-like waste oily material is stored to the storage tank and then sent by the pump 2 to the settling tank 3 heated to the temperature of 50°–70°C by a heater provided to the said tank 3 to increase the fluidity of the said waste oily material thereby accelating the settling velocity of water and the solid material.

The muddy-like waste oily material coming from the settling tank 3, after separating water and the solid material, is sent to the intermediate storage tank 5 through the centrifugal separator 4 in which the remaining water and the remaining solid material are removed, and then conditioned the PH value of the said muddy-like waste oily material to 2–4 and then cooled to the room temperature in the tank 5.

The oily material coming from the tank 5 is sent to the extracting tower 6 in which the paraffin base saturated hydrocarbon having the boiling point of 30°–200°C for example a petroleum solvent is added to the said oily material from the solvent tank 7 to solvent extract the low-sulfur containing fuel oil from the said muddy-like waste oily material and make it easy to separate the asphalt base sludge.

The fluid coming from the tank 6 is centrifuged by the centrifugal separator 8 to remove the asphalt base sludge from the said fluid. The low-sulfur containing fuel fraction is sent to the second intermediate storage tank 10 after further removing the remaining sludge contained in the said fraction by the filter 9. The low sulfur containing fuel oil fraction is sent to the distillating tower 13 after heating the said fraction at the temperature of about 250°C by means of the heat exchanger 11 and the preheating furnace 12 to distill out the paraffin base saturated hydrocarbon and then sent to the product storage tank 14 through the heat exchanger 11.

While, the paraffin base saturated hydrocarbon coming from the top of the distillating tower 13 is recycled to the solvent storage tank 7 through the condenser 15. The asphalt base sludge coming from the centrifugal separator 8 and the filter 9 is sent to the stripper 16 to strip the oil fraction contained in the said sludge with the superheated steam of about 250°C. Steam and vapors flowing from the stripper 16 are condensed in the condensor 18 and flow to a settling tank 19 from which the oil fraction can be recovered or be recycled.

After stripping, the asphalt base sludge is sent to the sludge distillating still 17 from the bottom of the stripping tower 16.

The inactive gas is blown into the sludge distillating still 17 from the inactive gas storage tank 20 after preheating the inactive gas at the temperature of about 500° – 600°C, by the gas pre-heating furnace 21. The asphalt base sludge coming from the stripper 16 is dry-distillated in the said still 17 by blowing into the still 17, hot inactive gas preheated in the furnace 21 heated by the burner 25 or a super-heated steam.

The said still 17 is also heated from outside thereof by directly firing and jacket heating.

The inactive gas containing a cracking oil vapour coming from the top of the still 17 is sent to the condenser 22 to condense the cracking oil, which is collected at the bottom of the condenser 22 and then sent to the cracking oil storage tank 23.

The inactive gas containing noncondensed cracking gas coming from the condenser 22 is recycled to the still 17 together with newly supplied inactive gas through the blower 24 and the gas preheater 21. The coke-like sludge is discarded into the sludge storage tank 27 after dry-distillating the asphalt base sludge.

The one of the characteristic features of this invention lies in the joint use of the inner heating by the hot inactive gas or the super-heated steam and the outer-heating by direct-firing or jacket heating, while slowly agitating the sludge within the still 17 by the agitator 26, whereby the coke like sludge not containing any oil component is maintained in a powder state and is easy to discharge from the still 17.

The said coke-like sludge is discharged into the ash storage tank 27. In the still 17, there is no fear of locally heating and thereby adhering the sludge on an inner wall of the still 17 which will be brought by the directly firing from the outside of the still 17, thereby depressing the heat conductivity on the inner wall of the still 17 and making it difficult to discharge the coke-like sludge from the still 17.

The other characteristic features of this invention are shown as follows:

1. The prior process for treating the muddy-like waste oily material of the industrial waste material has been effected by a burning process. Therefore, many troublesome problems and costs have been involved in the treatment of the exhaust gas in the prior burning process which may bring the secondary pollution, since the industrial waste material often contains harmful substances such as a sulfur containing oil or a sulfur containing exhaust gas.

2. The exhaust gas not containing any sulfur compound is produced by the process of this invention, since the cracking is effected at the temperature of less than the decomposition temperature of the sulfur compounds namely the temperature of less than about 600°C.

What is claimed is:

1. A process for treating muddy-like waste oily materials characterized by comprising a first step of settling and separating the muddy-like oily material layer and a layer containing water and a solid material in a settling tank while maintaining a temperature of the said tank to 50°–70°C.; the second step of conditioning the pH of the said muddy-like oily material to 2–4; the third step of extracting a low sulfur containing fuel oil from the said muddy-like oily material coming from the second step with a paraffin base saturated hydrocarbon having a boiling point of 30°– 250°C. in an extracting tower while maintaining a temperature of 5°–25°C.; a fourth step of centrifuging the said muddy-like oil material coming from the third step to separate the low sulfur containing fuel oil fraction containing the said paraffin base saturated hydrocarbon and an asphalt base sludge which is discarded as a coke-like sludge not containing any oil material after dry-distillating the said asphalt base sludge at a temperature of 500°–600° C. in a sludge dry distillating still, and a fifth step of fractionally distillating the said paraffin base saturated hydrocarbon from the said low sulfur containing fuel oil fraction to produce the said low sulfur containing fuel oil.

2. The process as claimed in claim 1 wherein the dry distillation is effected by blowing a preheated inactive gas or a super heated steam into the still which is direct fired or jacket-heated from the outside thereof while slowly agitating the sludge.

3. The process as claimed in claim 1 wherein the asphalt base sludge has the oil fraction contained therein primarily stripped therefrom by super heated steam prior to the dry distillating thereof, the dry distillation being effected by blowing a preheated inactive gas or a super heated steam into the still, and collecting the inactive vapor flowing from the top of the still and condensing such vapor.

4. The process as claimed in claim 1 wherein the muddy-like oily material is cooled to room temperature between the said second and third steps.

5. The process as claimed in claim 1 and including the step of filtering said fuel oil fraction obtained in said fourth step to separate any asphalt base sludge therein prior to said fifth step.

* * * * *